United States Patent [19]

Shuey et al.

[11] Patent Number: 5,401,308
[45] Date of Patent: Mar. 28, 1995

[54] QUEBRACHO-MODIFIED BITUMEN COMPOSITIONS, METHOD OF MANUFACTURE AND USE

[75] Inventors: Mark W. Shuey, San Jose; Robert S. Custer, Whittier, both of Calif.

[73] Assignee: Saramco, Inc., Whittier, Calif.

[21] Appl. No.: 255,323

[22] Filed: Jun. 7, 1994

[51] Int. Cl.⁶ ............................................. C09D 195/00
[52] U.S. Cl. .................. 106/273.1; 106/216
[58] Field of Search ............................ 106/216, 273.1

[56] References Cited

U.S. PATENT DOCUMENTS 2,085,992 7/1937 Nelson ............................ 106/273.1

FOREIGN PATENT DOCUMENTS 63-17960 1/1988 Japan .

Primary Examiner—David Brunsman
Attorney, Agent, or Firm—Jacques M. Dulin; Frederick J. Zustak

[57] ABSTRACT

The addition of from about 0.1 to about 25 parts by weight of quebracho per 100 parts of bitumens (particularly asphalt), coal tar, or other high boiling tars containing mixtures of aliphatic and aromatic hydrocarbons modifies the characteristics of the treated product to enhance its performance as hot-melt adhesives, coatings, sealants, roof-coatings, and road-coatings as compared to the base bitumen. The improved characteristics obtained by the addition of quebracho include: increased softening point, lower penetration number, and higher viscosity. The quebracho may be mixed directly with the tars or put into a water solution, using sodium hydroxide if necessary, and then added to hot tars with the water being driven off.

17 Claims, 2 Drawing Sheets

QUEBRACHO-MODIFIED BITUMEN COMPOSITIONS, METHOD OF MANUFACTURE AND USE

CROSS REFERENCE TO RELATED CASE

This application is related to an application entitled Quebracho/Surfactant Compositions As Universal Bitumen/Water Emulsifiers, Ser. No. 08/255,339, filed Jun. 7, 1994 by the same inventors, the disclosure of which is incorporated by reference if need be. That application relates to bitumen-in-water emulsions. This application relates to non-emulsified quebracho-modified bitumen compositions.

FIELD OF THE INVENTION

This invention relates to modified bitumen compositions having a viscosity modifier added thereto and the method of making and using them. More particularly, this invention relates to modified bitumen compositions having a quebracho added thereto, the method of making quebracho-modified bitumen compositions, particularly the addition of quebracho to asphalt and coal tar to form a modified bitumen composition having a viscosity higher than the base bitumen, as well as other enhanced chemical and physical attributes, and a method of using the modified bitumen composition.

BACKGROUND OF THE INVENTION

Bitumens are naturally occurring or pyrolytically obtained substances of dark to black color consisting almost entirely of carbon and hydrogen with very little oxygen, nitrogen, and sulfur. Bitumens vary widely in hardness and volatility, ranging from crude oil to asphaltines.

Asphalt is a naturally occurring bitumen. It is also a petroleum byproduct, from which it is manufactured in commercial quantities by the removal of volatile components. Asphalt is composed of hydrocarbons and heterocyclic compounds having molecular weights varying from about 400 to above 5000. It is both thermoplastic and viscoelastic; i.e., at high temperatures or over long loading times it behaves as a viscous fluid, while at low temperatures or short loading times it behaves as an elastic body.

The three distinct types of asphalt made from petroleum residues are straight-run, air blown, and cracked. Straight run asphalt, characterized by a nearly viscous flow, is used in the construction of pavement surfaces for roads and airport runways. In this application, thermoplastic behavior is an undesirable characteristic in that the high temperatures experienced by roadway surfaces in a warmer climate or on hot days would result in excessive deformation of a thermoplastic asphalt when subjected to normal vehicle or aircraft loads. Ideally, the asphalt used in a pavement surface application would exhibit no flow, either viscous or thermoplastic, yet remain elastic. Air-blown asphalt is resilient and has a viscosity that is less susceptible to temperature change than that of straight-run asphalt. It is used mainly for roofing, pipe coating, paints, underbody coatings, and paper laminates. This type of asphalt, while suitable for insulation and prophylactic applications, is not of sufficient hardness for pavement surfaces. Cracked asphalt, with limited applications such as dust laying or as an insulation board saturant, has a nearly viscous flow, but its viscosity is more susceptible to temperature change than straight-run asphalt.

Tannin or a tannin compound in combination with a surfactant and a heated bitumen to provide a bitumen-in-water emulsion have been described in the art. The published Kao Soap Company Japanese patent document by Ryooichi, et al., Japanese patent document 63–17960, reports a slow-setting, cationic, asphalt-in-water emulsion made from an emulsifying composition, including a surfactant, a tannin or tannic acid compound, calcium chloride and hydrochloric acid to adjust the pH. Quebracho is listed as one of the tannic acid compounds that can be used as a tannin compound. The emulsifying composition is combined with heated asphalt in the ratio of 40% w/w emulsifying agent to 60% w/w asphalt. However, attempts to reproduce the reported results of the Kao emulsion have been unsuccessful. The art is silent as to the mixing of quebracho with a bitumen to form a modified bitumen composition.

Quebracho is a natural product extracted from the heartwood of the Schinopsis trees that grow in Argentina and Paraguay. Quebracho is a well characterized polyphenolic and is readily extracted from the wood by hot water. Quebracho is currently widely used as a tanning agent. It is also used as a mineral dressing, as a dispersant in drilling muds, and in wood glues.

Quebracho is commercially available as a crude hot water extract, either in lump, ground, or spray-dried form, or as a bisulfite treated (refined) spray-dried product that is completely soluble in cold water. Quebracho is also available in a "bleached" form which can be used in applications where the dark color of unbleached quebracho is undesirable. The production of quebracho has been carried out for many years. Although quebracho is a natural product and has some variation in composition, it is a consistent source of the polyphenols that we have found are useful as a bitumen modifier for the modified bitumen compositions of this invention.

A road pavement's ability to support loads depends primarily upon the magnitude of the load, how often it is applied, the supporting power of the soil underneath, and the type and thickness of the pavement structure. Rigid pavements are constructed from concrete. Flexible pavements have less bending resistance than rigid pavements, and are typically composed of aggregate (sand, gravel, or crushed stone) and bituminous material as the top layer (approximately 2 inches), and an overlying seal coat. As noted above, the asphalt used in the construction of pavement surfaces preferably exhibits minimum thermoplastic flow, has a high viscosity (minimum viscous flow), and high hardness. Unmodified or base asphalt products currently available do not have this ideal set of characteristics.

Consequently, there is a long felt need for a bituminous or asphalt composition having higher viscosity, greater hardness and less thermoplasticity as compared to an unmodified or base asphalt, and particularly for a bitumen or asphalt composition suitable for use as a pavement layer in roadway or airport runway construction, as well as other applications where higher viscosity, low thermoplasticity and greater hardness are desired characteristics.

THE INVENTION

OBJECTS

It is among the objects of this invention to provide a modified bitumen composition having a higher viscosity, lower thermoplasticity and greater hardness than unmodified bitumen and which overcomes the limitations of the existing art.

It is another object of this invention to provide a method of use of the modified bitumen composition of this invention.

It is yet another object of this invention to provide a process of making a modified bitumen composition having a higher viscosity, greater hardness and improved thermoplastic characteristics as compared to base or unmodified bitumen.

Yet another object of this invention is to provide a method of using a quebracho to modify bitumens, coal tars, and other high boiling tars to provide a modified bitumen composition having characteristics that will make the bitumen better suited for use as hot-melt adhesives, coatings, sealants, roofing, and road-coatings.

Still other objects, features, aspects and advantages of the present invention will become apparent from the following Summary, Detailed Description and claims of the present invention, when taken in conjunction with the accompanying drawing.

Bituminous materials (such as asphalt and gilsonite), coal tar, tar sands, oil shale and high boiling hydrocarbon fractions from petroleum distillation are widely used to manufacture hot-melt adhesives, coatings, sealants, roof-coatings, and road-coatings. At ambient temperatures, these bitumens are typically solids or highly viscous, semisolid liquids. To obtain a low viscosity liquid for easy application, these bitumens are either cut with an organic solvent such as napthalene or kerosene, heated to reduce the viscosity, or emulsified with water using emulsifiers and mechanical shearing. The water or solvents used in the emulsion evaporate after application, leaving a continuous film or layer of the bituminous residue.

We have discovered that quebracho is an excellent modifier of bitumens, coal tars, and other high boiling mixtures of aliphatic and aromatic hydrocarbons. When quebracho is combined with these bituminous compounds at the rate of about 0.1%–25% w/w of bitumen, the resulting quebracho-modified bitumen compositions, when used as hot-melt adhesives, coatings, sealants, roof-coatings and road-coatings, unexpectedly exhibit greater adhesion to substrates, greater resistance to abrasion, higher softening points, lower penetration numbers (i.e., greater hardness), and higher viscosity than unmodified bitumens. Quebracho as a natural product is a well characterized and consistent source of the polyphenolic component used in the modified bitumen compositions of this invention.

The quebracho used may be any of its normally available commercial forms. The quebracho may be introduced to a heated base bitumen as a dry, powdered or granular compound. The crude lump quebracho should be ground to a fine particle size to permit it to be easily incorporated into the hot bitumen. In ground form quebracho is typically a reddish brown or maroon-colored powder. Alternately, unground lump quebracho may be added directly to hot asphalt. Since all of the common grades of quebracho contain water (crude lump typically contains 18–20% water, crude spray-dried typically contains 5–6% water, and spray-dried refined typically contains 5–8% water), the contained moisture in the quebracho will be driven off by the hot asphalt, creating a mechanical agitation or turbulence that will assist in the break up of the lumps and facilitate dispersion of the quebracho throughout the hot asphalt. The lump material can sink to the bottom, however, and in that case it is necessary to provide some additional agitation to break up the lumps and disperse all of the quebracho into the hot asphalt.

Alternately, the quebracho may be predissolved in water or a hydrocarbon solvent prior to addition to the heated base bitumen. Crude quebracho is not fully soluble in cold water unless the water is adjusted to a pH above about 8.5. However, the crude material will dissolve slowly at water temperatures above about 120° F. The refined spray-dried quebracho results from treatment of the crude quebracho with sodium bisulfite and is fully soluble in cold water, creating an acidic solution. Upon addition of the quebracho solution to the hot bitumen, followed by mixing, the solvent is driven off leaving the quebracho in intimate admixture with the heated bitumen. The ultimate performance of the modified bitumen as used in any particular application will depend upon the physical characteristics of the bitumen. Fillers, extenders, and modifiers may be added to enhance the performance of the modified bitumen to make it better suited for a particular application. For instance, rubbers, fillers, and polymers may be added to the modified asphalt to make it ideally suited for use as a pavement. In addition, the modified asphalt may be either heated, cut with a solvent, or emulsified in water so as to reduce its viscosity thus facilitating its use.

We have discovered that the modified bitumen of this invention is ideally suited as a feedstock for making a bitumen-in-water emulsion. The modified bitumen of this invention is heated and then combined with an aqueous surfactant solution in the ratio of about 40% by weight aqueous surfactant solution to about 60% by weight of modified bitumen. The resulting emulsion is a slow-setting emulsion having a net negative charge (i.e., an anionic emulsion) and has the unexpected properties of higher viscosity, enhanced stability and decreased drying times. It is universal in that it can be used as such or with from 1–3 lbs. filler/lb of emulsion, or it has a high ionic overhead.

The following are terms, their abbreviations and intended meanings used in describing the compositions and methods of this invention:

Quebracho refers to the wood and bark extract of any number of South American trees of different genera of the order Sapindales. The main components are aspidospermine, tannin, tannic acid, and quebrachine. The two principle grades of quebracho include crude quebracho, and bisulfite-treated or refined quebracho.

Bitumen refers to any thermoplastic, naturally occurring or pyrolytically obtained substance having a dark to black color consisting almost entirely of carbon and hydrogen, with some nitrogen, sulfur, and oxygen. The term is intended to include heavy oils, tars, pitch, asphalt, and asphaltites.

Asphalt refers to any of the varieties of naturally occurring and petroleum-derived bitumens of varying molecular weights from about 400 to above 5000, and composed of hydrocarbons and heterocyclics containing nitrogen, sulfur, and oxygen.

BRIEF DESCRIPTION OF THE DRAWINGS

The invention is illustrated by reference to the drawings, in which.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Quebracho suitable for addition to bitumens (hereafter tar, tars, or asphalt) is commercially available as crude water extract in lump, ground, or spray-dried form and as bisulfite-treated (refined) extract in spray-dried granular form. There is also a somewhat lighter colored "bleached" quebracho available as a spray-dried granular material. While any of these forms may be used, the lump form or spray dried forms are preferred for addition of quebracho to the bitumen or molten tars as these are already dark in color and less expensive than the refined extract. However, the refined extract, or bleached form, is appropriate for use in those applications where the dark color of unbleached quebracho is undesirable.

Refined quebracho is obtained by treating the crude water extract with sodium bisulfite to obtain a quebracho product that is soluble in cold water. However, water solubility is not an issue where the quebracho is directly added to molten tars, and one of the crude, powdered forms is preferred for the direct addition method because of the lower cost even though more mixing and mechanical agitation is generally required.

Figure 1:
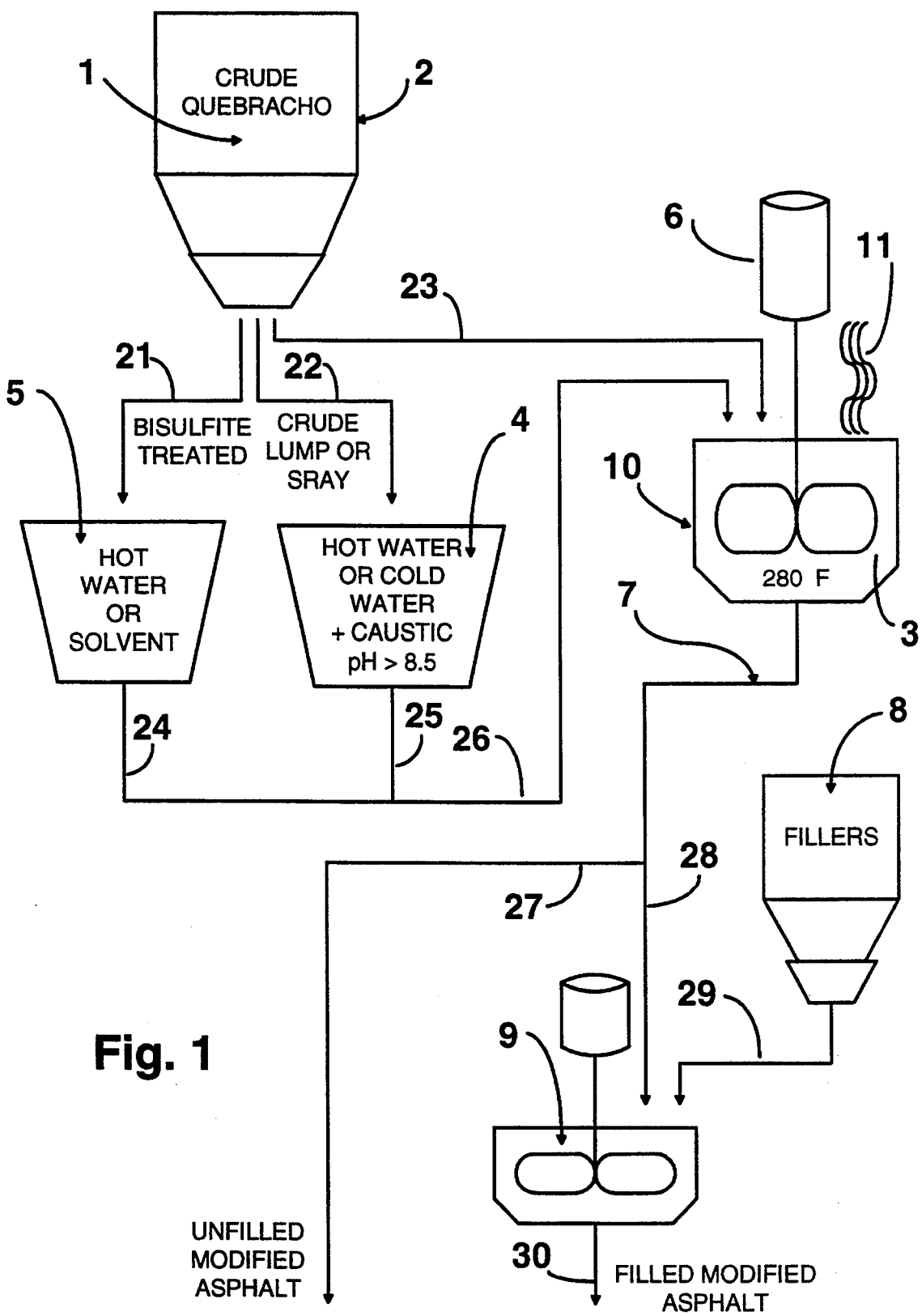
FIG. 1 shows the process flow diagram for the method of making the modified asphalt of this invention.

FIG. 1 shows the process flow of the method of making the modified asphalt product. Quebracho feedstock 1 is typically provided from a feed hopper 2 or other container. The quebracho may be either the lump crude, the spray-dried crude form 22, or the refined (bisulfite) form 21. Although the quebracho may preferably be added as a dry powder or granule directly to the asphalt mixture 3 via line 23 in the portions of at least 0.1 parts dry weight to 100 parts by weight asphalt and up to about 25 parts by weight. An alternate preferred method is to either dissolve the lump crude or the spray-dried crude 22 in: a) hot water 4 (at least 60° C.), b) in a cold aqueous caustic solution 4 having a pH of approximately 10, or c) a hydrocarbon solvent 4, and delivered to the hot asphalt 3 via lines 25 and 26. Alternately, the bisulfite treated quebracho 21 may be dissolved in hot water or a hydrocarbon solvent 5 and then subsequently added to the asphalt 3 via lines 24 and 26. At least 0.1 parts dry weight quebracho to 100 parts by weight asphalt is needed for both alternate preferred methods.

Upon addition of the quebracho 1 compound to the asphalt 3, there should be sufficient agitation or mechanical mixing to ensure that the quebracho is evenly mixed throughout the hot asphalt 3. As mentioned above, a preferred method is to add quebracho 1 to the hot asphalt 3 as a predissolved solution in water or in a hydrocarbon solvent to minimize agitation. On the other hand, if quebracho is added in lump form significant agitation will be required. The quebracho solution is delivered via line 26 to the hot asphalt 3 and is thoroughly mixed with the hot asphalt 3 using a mixing or agitation means 6. The temperature of the asphalt is sufficiently high, preferably about 280° F. that mixing is nearly immediate.

The organic solvent or water introduced with the quebracho is driven off as vapor 11 by the high temperatures of the molten asphalt 3. The crude lump material contains as much as 18–20% w/w moisture whereas the spray-dried products contain about 5–7% w/w moisture. In either case, this intrinsic moisture will also be driven off 11 by the high temperatures of the molten asphalt. Due care is needed to prevent injury or loss because of the potential for vigorous evolution of this moisture from the hot asphalt.

After complete mixing, the modified asphalt 7 is drawn from the hot asphalt mixing tank 10. Fillers 8 such as oxidants, antioxidants, antistrippers, rubbers, and mineral fillers may be added via line 29, if desired, to impart those qualities associated with filled asphalt, for example better aging characteristics, to the modified asphalt. A separate mixing tank 9 may be used to mix in the fillers or, alternately, the fillers may be added to the asphalt mixing tank 10.

The addition of quebracho to asphalt to produce the modified asphalt of this invention has produced unexpected results, including an increase in the softening point, increased viscosity and a decrease in the penetration number (harder).

Figure 2:
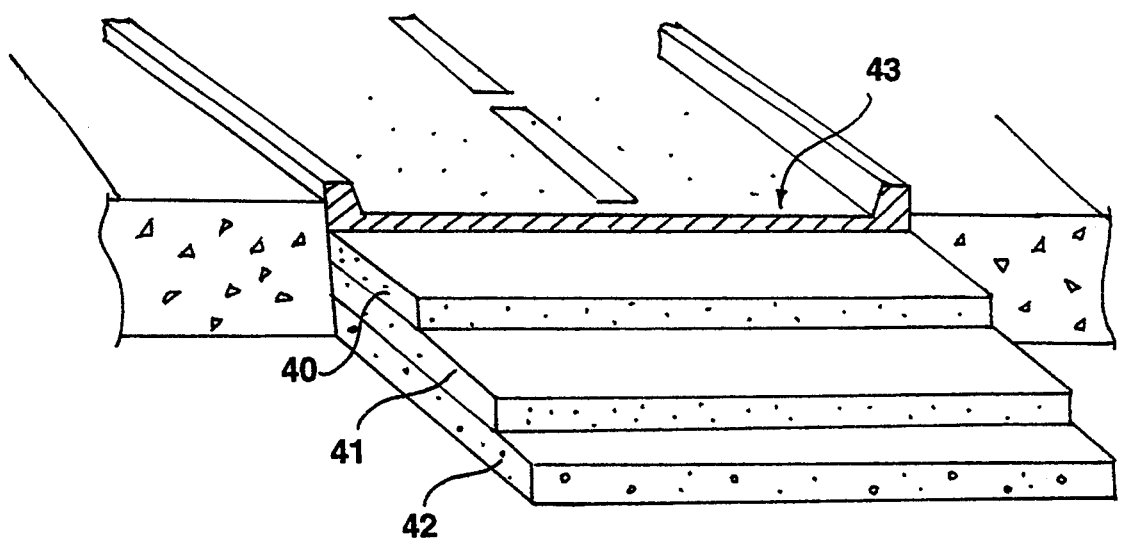
FIG. 2 is a cross-section diagram of the construction of a typical pavement using quebracho-modified bitumen of this invention.

FIG. 2 shows the typical construction of a roadway pavement. A two inch layer of bituminous material 40 is poured onto a three inch gravel base 41 which in turn sits on top of a five inch sand and gravel subbase 42. A light bituminous overcoat 43 is applied to seal the two inch bituminous layer 40. The characteristics of the modified asphalt of this invention make it better suited for pavement construction than base or unmodified asphalt. The increased hardness and higher viscosity result in a pavement surface that is less prone to flow under heat and pressure and more resistant to impacts. The practice of this invention may clearly be seen in the following examples:

EXAMPLE 1—Characterization of Modified Asphalt By Varying The Amount of Quebracho Asphalt was modified in a series of four blends by the addition of increasing amounts of quebracho: a 1% blend containing 5 gms of quebracho mixed with 495 gms of asphalt, a 2.0% blend contained 10 gms of quebracho mixed with 490 gms of asphalt, a 4.0% blend contained 20 gms of quebracho mixed with 480 gms of asphalt and an 8.0% blend contained 40 gms of quebracho mixed with 460 gms of asphalt. Note that a lower Penetration Number means the material is harder. The results are shown in Table I.

TABLE I

| Asphalt/Quebracho Blend Properties | | | |
|---|---|---|---|
| % Quebracho In Modified Asphalt | Asphalt Hardness- Penetration Number (dmm) | Viscosity 140° F. Poises | Softening Point °F. |
| 0.0% | 60 | 1726.6 | 114 |
| 1.0% | 58 | 2210.0 | 118 |
| 2.0% | 56 | 2220.8 | 119 |
| 4.0% | 52 | 2393.6 | 120 |

TABLE I-continued

Asphalt/Quebracho Blend Properties

| % Quebracho In Modified Asphalt | Asphalt Hardness-Penetration Number (dmm) | Viscosity 140° F. Poises | Softening Point °F. |
|---|---|---|---|
| 8.0% | 47 | 2721.6 | 122 |

Note:
The Penetration test is ASTM D5; the Viscosity test is ASTM D4957; and the Softening Point, is Ring and Ball, ASTM D 36.

This example shows the unexpected results obtained by modifying asphalt by the addition of quebracho. Hardness, as measured by penetration, appears to increase linearly with the percentage of quebracho, at least for the range of quebracho investigated. Surprisingly, the viscosity of the asphalt increases suddenly with just a 1% introduction of quebracho. Thereafter, the viscosity increases only slightly with 2% quebracho, but increases rapidly above 2% quebracho. The softening point, like the viscosity, appears to increase rapidly with low amounts of quebracho. However, as the percentage of quebracho increases, the softening point data suggests asymptotic behavior.

The results of Example 1 show that asphalt may be modified by the introduction of quebracho to impart the characteristics of increased hardness, increased viscosity, and a higher softening point. These characteristics make the modified asphalt composition of this invention better suited for those applications requiring these attributes, such as pavement for roadways and airport landing strips.

It should be understood that various modifications and within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. A modified bitumen composition, comprising:
   a) at least 0.1 percent by dry weight quebracho;
   b) 100 parts by weight bitumen; and
   c) said quebracho is intimately dispersed in said bitumen to provide a continuous phase of quebracho-modified bitumen having increased softening temperature, increased hardness, and increased viscosity.

2. A modified bitumen composition as in claim 1 wherein said quebracho is selected from the group consisting essentially of crude lump quebracho, crude spray-dried quebracho, sodium bisulfite-treated spray-dried quebracho, bleached spray-dried quebracho and mixtures thereof.

3. A modified bitumen composition as in claim 2 wherein:
   a) said quebracho is present in an amount of from about 0.1% by weight to 25% by weight in said bitumens.

4. A modified bitumen composition as in claim 1 wherein said bitumen is asphalt.

5. A modified bitumen composition as in claim 4 wherein:
   a) said quebracho is present in an amount of from about 0.1% by weight to 25% by weight in said asphalt.

6. A modified bitumen composition as in claim 1 wherein:
   a) said quebracho is present in an amount of from about 0.1% by weight to 25% by weight in said bitumens.

7. A method of making a modified bitumen composition comprising in operative order the steps of:
   a) heating a bitumen to above about its softening point to lower its viscosity to permit mechanical mixing and agitation of the bitumen;
   b) adding quebracho to said bitumen at the rate of 0.1 parts by dry weight to 25 parts by dry weight or more per 100 parts by weight of said bitumen; and
   c) mixing said quebracho with said bitumen to distribute said quebracho evenly in said bitumen to form a modified bitumen composition having increased softening temperature, increased hardness, and increased viscosity.

8. A method of making a modified bitumen as in claim 7 wherein said quebracho is in solid form upon introduction to said bitumen.

9. A method of making a modified bitumen as in claim 8 wherein:
   a) said quebracho is present in an amount of from about 0.1% by weight to 25% by weight in said bitumen.

10. A method of making a modified bitumen as in claim 7 wherein said quebracho is solubilized in a liquid prior to introduction to said bitumen.

11. A method of making a modified bitumen as in claim 10 wherein:
    a) said quebracho is present in an amount of from about 0.1% by dry weight to 25% by dry weight in said bitumen.

12. A method of making modified bitumen as in claim 10 wherein said quebracho is solubilized in water.

13. A method of making a modified bitumen as in claim 7 which includes the additional steps of:
    a) adding a filler material to said modified bitumen composition; and
    b) mixing said filler material evenly throughout said modified bitumen composition to form a filled modified bitumen having properties suitable for use as a pavement.

14. A method of making a modified bitumen as in claim 13 wherein:
    a) said quebracho is present in an amount of from about 0.1% by weight to 25% by weight in said bitumen.

15. A method of making modified bitumen as in claim 14 wherein said quebracho is solubilized in water.

16. A method of making a modified bitumen as in claim 7 wherein:
    a) said quebracho is present in an amount of from about 0.1% by weight to 25% by weight in said bitumen.

17. A method of using a modified bitumen comprising in operative order the steps of:
    a) providing a quebracho-modified bitumen;
    b) maintaining the viscosity of said modified bitumen low enough to be spreadable; and
    c) applying said modified bitumen to the surface to be treated.

* * * * *